United States Patent
Chiang et al.

(10) Patent No.: US 6,560,672 B1
(45) Date of Patent: May 6, 2003

(54) WRITE STRATEGY AND TIMING

(75) Inventors: Kevin Chiang, Fremont, CA (US); Shengquan Wu, Sunnyvale, CA (US); Li-Huan Jen, Santa Clara, CA (US)

(73) Assignee: Oak Technology, Inc., Sunnyvale, CA (US)

( * ) Notice: Subject to any disclaimer, the term of this patent is extended or adjusted under 35 U.S.C. 154(b) by 486 days.

(21) Appl. No.: 09/596,329

(22) Filed: Jun. 16, 2000

(51) Int. Cl.[7] .............................................. G06F 12/00
(52) U.S. Cl. ........................................ 711/112; 711/167
(58) Field of Search ................................ 711/112, 167, 711/104

(56) References Cited

U.S. PATENT DOCUMENTS 6,249,901 B1 * 6/2001 Yuan et al. .................... 716/5

* cited by examiner

Primary Examiner—Reginald G. Bragdon
Assistant Examiner—Mehdi Namazi
(74) Attorney, Agent, or Firm—John F. Schipper

(57) ABSTRACT

A method for set-up of a group of parameter values needed in a CD-R or CD-RW write cycle, where the time allotted for set-up is as low as six clock cycles. In a clock cycle from a preceding write cycle, first and second parameter values are read into first and second registers, and a third parameter value is read into a first SRAM. In clock cycles 1–5 of the present write cycle, fourth, fifth, sixth, seventh and eighth parameter values are read into second, third, fourth, fifth and sixth SRAMs. In clock cycle no. 6 or later of the present write cycle, three sums (or differences) of selected combinations of these eight parameter values are calculated and stored, new first and second parameter values are read into first and second registers, and a new third parameter value is read into another SRAM. The method is generalized to K parameters stored in registers, N parameters stored in SRAMs and calculation of M selected linear combinations of the K+N parameter values.

16 Claims, 3 Drawing Sheets

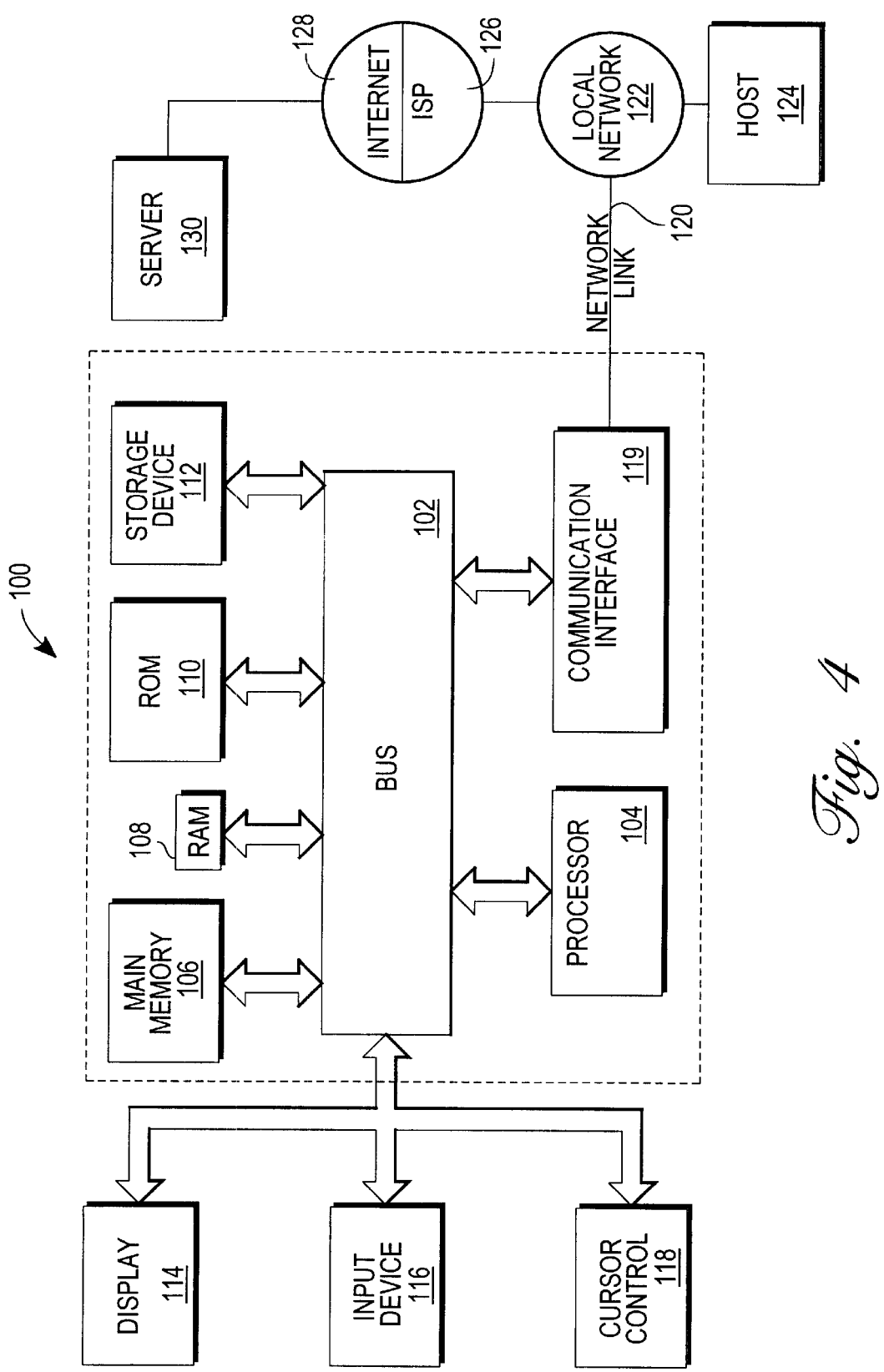

WRITE STRATEGY AND TIMING

FIELD OF THE INVENTION

This invention relates to timing of execution of activities associated with write commands in a computer system.

BACKGROUND OF THE INVENTION

A write cycle in a certain class of computer systems works with selected values associated with one or more of five consecutive bytes (a "five-byte sequence"), designated as PM (pre-mark; having a relatively high-value or "1"), PS (pre-space, having a relatively low value or "0"), MK (current mark), FS (post-space) and FM (post-mark) and illustrated in FIG. 1. In any write cycle, several parameters must be put into place before the write cycle begins or before the parameter(s) is first used in this cycle. In a write cycle, as now implemented, the number of parameters that must be read in and stored and the number of supplementary operations that must be performed cannot be fitted into the allotted time, using a conventional approach.

Presently, the system must read and store eight parameters and perform six addition operations within five clock cycles. All activities associated with a write cycle must be completed within six clock cycles. Use of a straightforward approach to these operations will not allow completion of these operations within the allotted time.

What is needed is an approach that allows completion of these operations within the minimum allotted time (six clock cycles). Preferably, the approach should be flexible enough to permit some modification of the constraints and to permit permutations in the order of parameters used for the calculations.

SUMMARY OF THE INVENTION

These needs are met by the invention, which in one embodiment uses the following. Three of the eight parameters are pre-read in a clock cycle before the six-clock-cycle sequence begins, using a relatively inactive cycle in the preceding sequence, from two selected registers and from a selected SRAM location and stored. The five remaining parameters are read from five SRAM locations and stored during the first five clock cycles of a six-clock-cycle sequence, with the sixth clock cycle in this sequence being used to perform the six addition operations.

BRIEF DESCRIPTION OF THE DRAWINGS

FIG. 4 illustrates a computer system that can be used to practice the invention.

DESCRIPTION OF BEST MODES OF THE INVENTION

A dynamic write cycle sequence in certain CD-R systems consists of N clock cycles, where N can be as low as six. Thus, any parameters that are needed in such a write sequence must be put into place in no more than six clock cycles, if system timing is not to be interrupted. One control parameter is Td, the delay time for a rising edge of an internal EFM signal to the rising edge of an EFM1 signal for CD-R. The Td parameter may have one of two forms, and both are preferably provided for the write cycle. Another control parameter is Tf, which defines or describes the falling edge of the EFM1 signal. A Td signal may have a range of between 0 and 1.25 T, where T is a selected timing unit, such as 10 nsec, with increments of T/32 A Tf signal may have a range of between 0 and 1.0 T, with increments of T/32.

Figure 1:
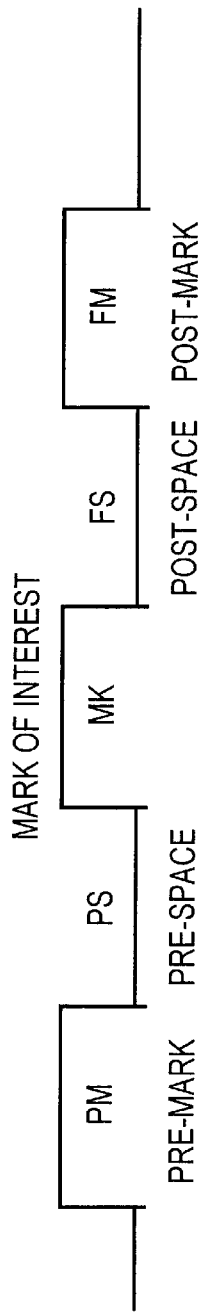
FIG. 1 illustrates a portion of a representative digital signal stream s(t), defined by a sequence of marks and spaces, versus time.

The first and second forms of the Td signal and the Tf signal are defined by $$T_{LMK}(1) = TLI_{MK} + TL_p(PS,PM) + TL_F(MK,FS,FM), \quad (1)$$

$$T_{LMK}(2) = TLI_{MK} + TL_p(FS,FM) + TL_F(MK,PS,PM), \quad (2)$$

$$T_{FMK} = TFI_{MK} + TF_F(FS,FM) + TF_p(MK,PS,PM), \quad (3)$$

respectively. Here $TLI_{MK}$, $TFI_{MK}$, $TL_p(PS,PM)$, $TL_F(MK,FS,FM)$, $TL_p(FS,FM)$, $TL_F(MK,PS,PM)$, $TF_F(FS,FM)$ and $TF_p(MK,PS,PM)$ are eight parameters that must be loaded and added as indicated during the write cycle. Normally, loading a parameter from an SRAM or from a register requires one clock cycle, and addition of the contents of two or more registers also requires one clock cycle. If the quantities $T_{LMK}(1)$, $T_{LMK}(2)$ and $T_{FMK}$ are calculated in a conventional approach, these operations will require a minimum of about 12 clock cycles, which would disrupt the system timing. The quantities $TLI_{MK}$ and $TFI_{MK}$ change slowly relative to changes in the other six parameter values, which change with the present values of the indicated byte values. For example, $TL_F(MK,FS,FM)$ will depend upon and change with the byte values MK, FS and FM for a particular five-byte sequence (FIG. 1). The quantity $TL_F(MK,PS,PM)$ depends only upon the values of the first three bytes in a five-byte sequence and thus is available earlier in the sequence than is a parameter such as $TL_F(MK,FS,FM)$, which depends upon one or more of the byte values for the post-space (FS) and/or post-mark (FM) bytes in the same five-byte sequence.

Figure 2:
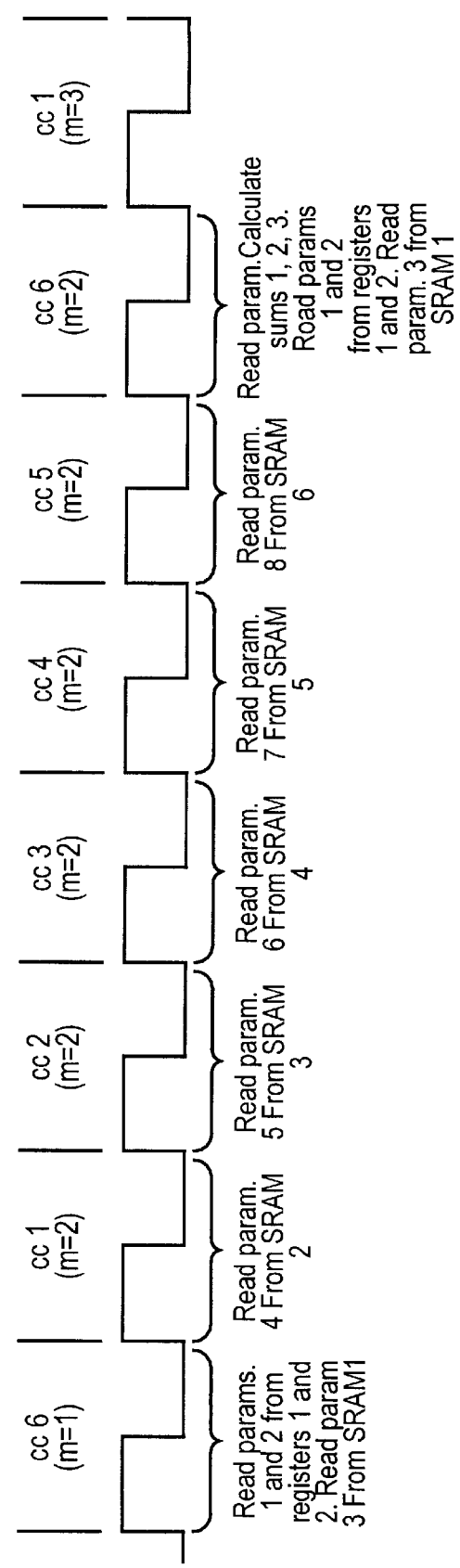
FIG. 2 illustrates practice of the invention, with reference to two consecutive six-clock-cycle sequences.

FIG. 2 illustrates a method of practice of the invention, using portions of two consecutive six-clock-cycle write cycles, numbered m=1 and m=2. During the sixth clock cycle of the first write cycle (m=1), first and second parameters, $TLI_{MK}$ and $TFI_{MK}$, are read from two selected registers and a third parameter, $TL_F(MK,PS,PM)$ or $TL_p(PS,PM)$, is read from a first SRAM. The first, second and third parameters are stored at locations determined by the particular write cycle. This occurs during a clock cycle of the preceding write cycle (shown as clock cycle six for definiteness in FIG. 2).

At each of the first five clock cycles of the next write cycle (m=2), fourth, fifth, sixth, seventh and eighth parameters, $TL_p(PS,PM)$ or $TL_F(MK,PS,PM)$, $TL_p(FS,FM)$, $TL_F(MK,FS,FM)$, $TF_F(FS,FM)$ and $TF_p(MK,PS,PM)$, are read from five different SRAMs and stored. In a sixth or later clock cycle of the second write cycle (m=2), the six additions indicated in Eqs. (1), (2) and (3) are carried out, new first and second parameters, $TLI_{MK}$ and $TFI_{MK}$, are read from two selected registers (optionally the same as at least one of the first and second registers), and a new third parameter, $TL_F(MK,PS,PM)$ or $TL_p(PS,PM)$, for the next write cycle is read from another SRAM (optionally, the same as one of the first, second, third, fourth, fifth and sixth SRAMs). FIG. 2 illustrates one allocation, among many, of the parameter reads from SRAMs that are carried out.

This approach can be generalized to collection of N+K parameters during N clock cycles, where $N \geq 2$ and $K \geq 1$.

The first K parameter, numbered k=1, ..., K, are read from K registers and stored, and parameter number K+1 is read from SRAM number 1 and stored, during a relatively inactive clock cycle in a preceding write sequence. Parameter value K+r+1(r=1, ..., N−1) is read from an SRAM (number r+1) and stored during clock cycle number r of the present write cycle. During clock cycle N of the present write cycle, M addition operations are performed, a new set of the first K parameter values are read from registers and stored, and a new parameter number K+1 is read from an SRAM and stored.

Figure 3:
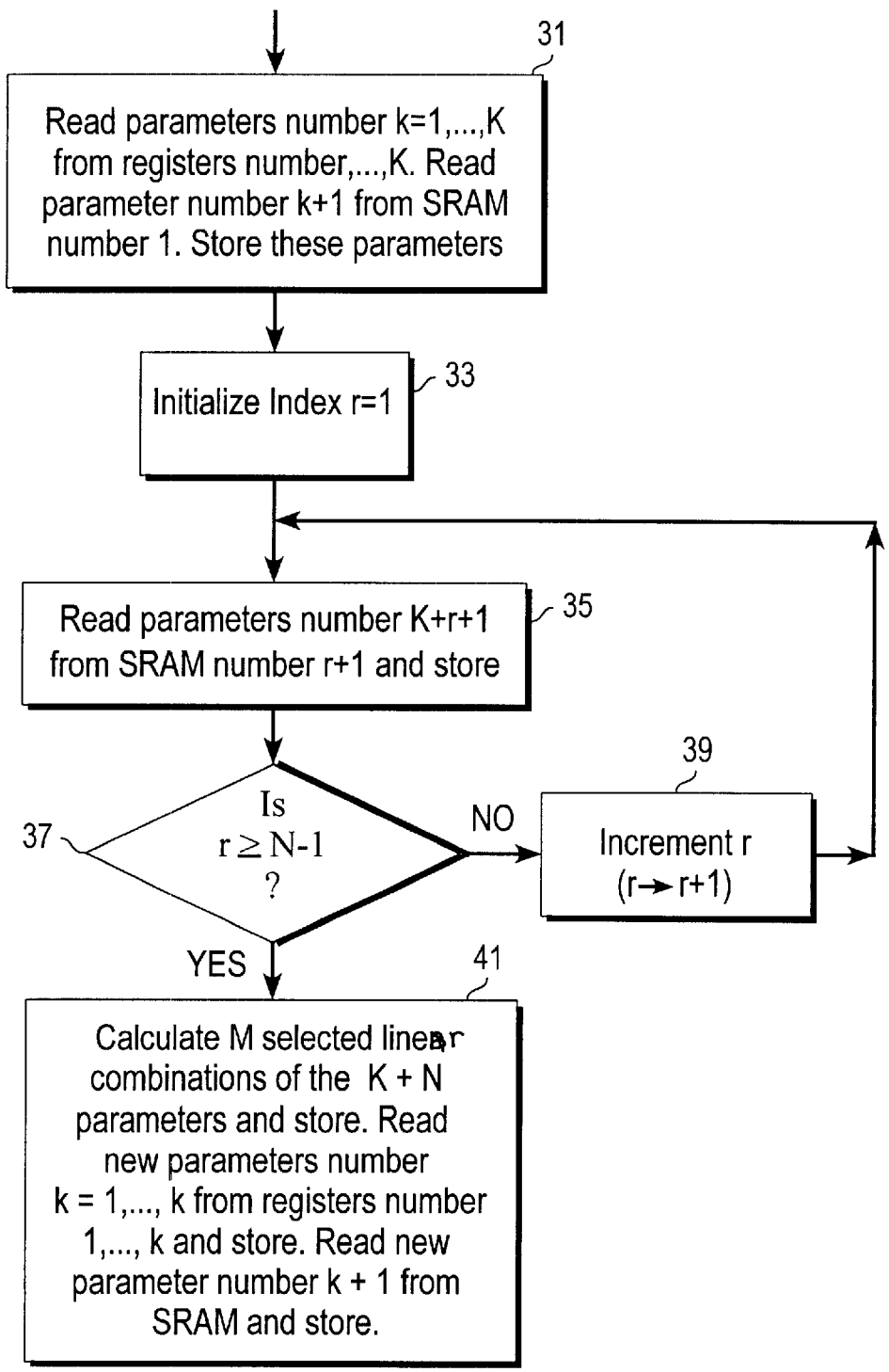
FIG. 3 is a flow chart illustrating practice of the invention.

FIG. 3 is a flow chart illustrating this generalized practice of the invention. In step 31 (clock cycle no. N or later of a preceding write cycle), the first K parameters are read from K selected registers and parameter number K+1 is read from SRAM number 1 for a first five-byte sequence. In step 33, an index r is initialized to r=1. In step 35, parameter number K+r+1 is read from SRAM number r+1 and stored. In step 37, the system determines if r≧N−1. If the answer to this query is "no", the system increments r by 1 (r→r+1) in step 39 and returns to step 35. If the answer to this query is "yes", the system: calculates M selected linear combinations (sums, differences, etc.) of the K+N parameters and stores these combinations, reads a new set of the first K parameters from K registers and stores them, and reads a new parameter number K+1 from an SRAM and stores this value, in step 41.

One or more of the addition operations in FIG. 2 or FIG. 3 can be replaced by a subtraction operation, as required for a CD-RW cycle discussed in the following. The invention for the particular choices K=2, N=6 and M=6 is illustrated in FIG. 2.

A similar timing strategy can be implemented for a CD-RW system, where the defining relations are $$T_{LMK} = TLI_{MK} - TL_p(PS,PM) - TL_F(MK,FS,FM), \quad (4)$$

$$T_{FMK}(1) = TFI_{MK} - TF_F(FS,FM) - TF_p(MK,PS,PM), \quad (5)$$

$$T_{FMK}(2) = TFI_{MK} - TF_F(FS,FM) - TF_p(MK,PS,PM). \quad (6)$$

The number of parameters to be collected is eight or fewer, the number of subtraction operations is six, and the minimum number of clock cycles in a write cycle is six.

Each of the sequence of operations (read, store, add, subtract) indicated in Eqs. (1), (2) and (3), or in Eqs. (4), (5) and (6), would require an estimated 12 clock cycles, if performed in a conventional manner. The approach disclosed herein allows each of these two sequences of operations to be performed in no more than six clock cycles, which is the minimum number of clock cycles allotted for a write cycle. This approach also allows permutation of the particular third, fourth, fifth, sixth, seventh and eighth parameter values that are read from the six SRAMs and stored.

FIG. 4 shows a block diagram of a general computer system 100, which may be used to implement various hardware components of the invention, such as a client an applications server and a database management system. The computer system 100 includes a bus 102 or other communication mechanism for communicating information and a processor 104, coupled with the bus 102, for processing information. The computer system 100 also includes a main memory 106, such as a random access memory (RAM) or other dynamic storage device, coupled to the bus 102, for storing information and instructions to be executed by the processor 104. The main memory 106 also may be used for storing temporary variables or other intermediate information during execution of instructions by the processor 104. The computer system 100 further optionally includes a read only memory (ROM) 110 or other static storage device, coupled to the bus 102, for storing static information and instructions for the processor 104. A storage device 112, such as a magnetic disk or optical disk, is provided and is coupled to the bus 102 for storing information and instructions.

The computer system 100 may also be coupled through the bus to a display 114, such as a cathode ray tube (CRT), for displaying information to a computer user. An input device 116, including alphanumeric and other keys, is coupled to the bus for communicating information and commands to the processor 110. Another type of user input device is a cursor control 118, such as a mouse, a trackball or cursor direction keys for communicating direction information and command selections to the processor 104 and for controlling cursor movement on the display 114. This input device typically has one degree of freedom in each of two axes, such as x- and y-axes, that allows the device to specify locations in a plane.

The functionality of the invention is provided by the computer system 100 in response to the processor 104 executing one or more sequences of instructions contained in main memory 106. These instructions may be read into main memory 106 from another computer-readable medium, such as a storage device 112. Execution of the sequences of instructions contained in the main memory 106 causes the processor 104 to perform the process steps described herein. In alternative embodiments, hard-wired circuitry may be used in place of, or in combination with, software instructions to implement the invention. Embodiments of the invention are not limited to any specific combination of hard-wired circuitry and software.

The term "computer-readable medium", as used herein, refers to any medium that participates in providing instructions to the processor 104 for execution. This medium may take many forms, including but not limited to non-volatile media, volatile media and transmission media. Non-volatile media includes, for example, optical and magnetic disks, such as the storage disks 112. Volatile media includes dynamic memory, such as RAM, in the storage device 112. Transmission media includes coaxial cables, copper wire and fiber optics and includes the wires that are part of the bus 102. Transmission media can also take the form of acoustic or electromagnetic waves, such as those generated during radiowave, infrared and optical data communications.

Common forms of computer-readable media include, for example, a floppy disk, a flexible disk, a hard disk, magnetic tape or any other magnetic medium, a CD-ROM, any other optical medium, punchcards, paper tape, any other physical medium with patterns of holes or apertures, a RAM, a ROM, a PROM, an EPROM, a Flash-EPROM, any other memory chip or cartridge, a carrier wave as described hereinafter, or any other medium from which a computer can be read.

Various forms of computer-readable media may be involved in carrying out one or more sequences of one or more instructions to the processor 104 for execution. For example, the instructions may initially be carried on a magnetic disk of a remote computer. The remote computer can load the instructions into its dynamic memory and send the instructions over a telephone, using a modem. A modem local to the computer system 100 can receive data over a telephone line and use infrared transmitter to convert and transmit the data to the an infrared detector connected to the computer system bus. The bus will carry the data to the main memory 106, from which the processor receives and executes the instructions. Optionally, the instructions receive by the main memory 106 can be stored on the storage device 112, either before or after execution by the processor 104.

The computer system 100 also includes a communications interface 119, coupled to the bus 102, which provides two-way data communication coupling to a network link 120 that is connected to a local area network (LAN) or to a wide area network (WAN). For example, the communications interface 119 may be an integrated services digital network (ISDN) card or a modem to provide a data communication connection to a corresponding type of telephone line. As another example, the communications interface 119 may be a local area network card to provide a data communication connection to a compatible LAN. Wireless links may also be implemented. In any such implementation, the communications interface 119 sends and receives electrical, electromagnetic or optical signals that carry digital data streams representing various types of information.

The network link 120 typically provides data communication through one or more networks to other data devices. For example, the data link 120 may provide a connection through an LAN 122 to a host computer 124 or to data equipment operated by an Internet Service Provider (ISP) 126. The ISP, in turn, provides data communication services through the world wide packet data communication network, now commonly known as the "Internet" 128, served by one or more servers 130. The LAN 122 and the Internet 128 both use electrical, electromagnetic and/or optical signals to carry the digital data streams. The signals carried by these network, the signals carried on the network link 120 and the signals carried on the communications interface 119, are examples of carrier waves that transport the information.

What is claimed is:

1. A method for set-up of parameters needed in a write cycle for a CD-R or CD-RW system within a limited time interval, the method comprising:

providing at least two consecutive time intervals, numbered m=1 and m=2, each containing at least six clock cycles;

providing first and second, selected parameter value, stored in first and second registers, and providing third, fourth, fifth, sixth, seventh and eighth selected parameter values, stored in first, second, third, fourth fifth and sixth SRAMs;

for a selected clock cycle of time interval number m=1, reading the first and second parameter values from the first and second registers, respectively, and reading the third parameter value from the first SRAM;

for five selected clock cycles of time interval number m=2, reading the fourth, fifth, sixth, seventh and eighth parameter values from the second, third, fourth, fifth and sixth SRAMs, respectively; and during a sixth clock cycle that follows the five selected clock cycles within the time interval m=2:
  calculating a first selected linear combination of the first, third and fourth parameter values;
  calculating a second selected linear combination of the first, fifth and sixth parameter values;
  calculating a third selected linear combination of the second, seventh and eighth parameter values;
  placing the first, second and third linear combinations in third, fourth and fifth selected registers, respectively;
  reading new first and second parameter values into sixth and seventh selected registers, respectively; and
  reading a new third parameter value into a seventh SRAM.

2. The method of claim 1, further comprising choosing said first and second parameter values from a group consisting of $TLI_{MK}$ and $TFI_{MK}$.

3. The method of claim 2, further comprising choosing said third parameter value from a group consisting of $TL_P(PS,PM)$ and $TL_F(MK,PS,PM)$).

4. The method of claim 2, further comprising choosing said third parameter value from a group consisting of $TL_P(PS,PM)$ and $TF_P(MK,PS,PM)$).

5. The method of claim 1, further comprising choosing said third, fourth, fifth, sixth, seventh and eighth parameter values from a group consisting of $TL_P(PS,PM)$, $TL_F(MK,PS,PM)$, $TL_P(FS,FM)$, $TL_F(MK,FS,FM)$, $TF_F(FS,FM)$ and $TF_P(MK,PS,PM)$.

6. The method of claim 1, further comprising choosing said third, fourth, fifth, sixth, seventh and eighth parameter values from a group consisting of $TL_P(PS,PM)$, $TL_F(MK,FS,FM)$, $TF_F(FS,FM)$, $TF_P(MK,PS,PM)$, $TF_F(PS,PM)$ and $TF_P(MK,FS,FM)$.

7. The method of claim 1, further comprising choosing at least one of said sixth register and said seventh register to be the same as at least one of said first register and said second register.

8. The method of claim 1, further comprising choosing said seventh SRAM to be the same as at least one of said first, second, third, fourth, fifth and sixth SRAMs.

9. A method for set-up of parameters needed in a write cycle for a CD-R or CD-RW system within a limited time interval, the method comprising:

providing at least two consecutive time intervals, numbered m=1 and m=2, each containing at least N clock cycles, for a selected integer $N \geq 2$;

providing K+N selected parameter values, numbered k=1, . . . , K+N, stored in K registers, numbered k=1, . . . , K and stored in N SRAMs, numbered n=1, . . . , N, for a selected integer $K \geq 1$;

for a selected clock cycle of time interval number m=1, reading the first K parameter values from the K registers, and reading parameter value number K+1 from SRAM number 1 and storing these K+1 parameter values;

for N−1 selected clock cycles of time interval number m=2, reading the parameter value numbered from SRAM number K+r+1 and storing this parameter value for r=1, . . . , N−1; and for an Nth clock cycle that follows the N−1 selected clock cycles within the time interval m=2:
  calculating M selected linear combinations of the K+N parameter values for a selected integer $M \geq 3$ and storing the M linear combinations;
  reading new parameter values number k=1, . . . , K from K selected registers; and
  reading a new parameter value number K+1 from a selected SRAM.

10. The method of claim 9, further comprising choosing said integer K=2.

11. The method of claim 9, further comprising choosing said integer N=6.

12. The method of claim 9, further comprising choosing said integer M=6.

13. An article of manufacture comprising:

a computer usable medium having computer readable program code means embodied in the medium said computer readable program code means including:

computer readable program code means for causing a computer to provide at least two consecutive time intervals, numbered m=1 and m=2, each containing at least N clock cycles, with $N \geq 2$;

computer readable program code means for causing a computer to provide K+N selected parameter values, numbered k=1, ..., K+N, stored in K registers, numbered k=1, ..., K and stored in N SRAMs, numbered n=1 ...,N, with $K \geq 1$;

for a selected clock cycle of time interval number m=1, computer readable program code means for causing a computer to read the first K parameter values from the K registers, and reading parameter value number K+1 from SRAM number 1 and storing these K+1 parameter values;

for N−1 selected clock cycles of time interval number m=2, computer readable program code means for causing a computer to read the parameter value numbered K+r+1 from SRAM number r+1 and storing this parameter value for r=1, ..., N−1; and for an Nth clock cycle that follows the N−1 selected clock cycles within the time interval m=2 computer readable program code means for causing a computer:

to calculate M selected linear combinations of the K+N parameter values for a selected integer $M \geq 3$ and to store the M linear combinations;

to read new parameter values number k=1, ..., K from K selected registers; and to read a new parameter value number K+1 from a selected SRAM.

14. The article of manufacture of claim 13, wherein said integer K=2.

15. The article of manufacture of claim 13, wherein said integer N=6.

16. The article of manufacture of claim 13, wherein said integer M=6.

* * * * *